United States Patent [19]

Tanaka

[11] 3,998,565

[45] Dec. 21, 1976

[54] TAPPER INCORPORATING REVERSE ROTATION MECHANISM

[75] Inventor: Yuzuru Tanaka, Daito, Japan

[73] Assignee: Daisyowa Seiki Co., Ltd., Osaka, Japan

[22] Filed: Oct. 25, 1974

[21] Appl. No.: 518,182

[30] Foreign Application Priority Data

Jan. 9, 1974  Japan ................ 49-6205[U]

[52] U.S. Cl. .............................. 408/132; 10/89 F; 74/376; 408/124; 408/140
[51] Int. Cl.² ...................... B23B 47/14; B23G 3/00
[58] Field of Search .......... 408/124, 139, 137, 140, 408/142, 132; 10/136, 89 F; 74/792, 798, 376

[56] References Cited

UNITED STATES PATENTS

| 3,037,393 | 6/1962 | Bernhard | 408/124 |
| 3,144,783 | 8/1964 | Dubendorfer | 408/124 X |
| 3,226,993 | 1/1966 | Varbäck | 408/124 X |
| 3,397,588 | 8/1968 | Johnson | 408/132 X |
| 3,717,892 | 2/1973 | Johnson | 408/140 X |

Primary Examiner—Othell M. Simpson
Assistant Examiner—William R. Briggs
Attorney, Agent, or Firm—Larson, Taylor & Hinds

[57] ABSTRACT

Tapper comprising a rotatable tapper main body, a positive rotation transmitting element and a reverse rotation transmitting element disposed in the main body, a holder member disposed in a lower portion of the main body, a driven shaft for holding a tap supported by the holder member and rotatable in positive and reverse directions, and a clutch ring for switching the direction of rotation mounted on the driven shaft. The axial displacement of the driven shaft brings the clutch ring into engagement with the positive rotation transmitting element or the reverse rotation transmitting element selectively to rotate the driven shaft in positive or reverse direction. Each of the clutch and the reverse rotation transmitting element is axially movably supported by a spring for absorbing an axial impact load to be exerted on the driven shaft when the direction of rotation is switched.

2 Claims, 4 Drawing Figures

TAPPER INCORPORATING REVERSE ROTATION MECHANISM

BACKGROUND OF THE INVENTION

The present invention relates to improvements in a tapper incorporating a reverse rotation mechanism in which the direction of rotation can be switched smoothly all the time, from positive to reverse or reverse to positive, so as to prevent accidental damage to the tap.

As disclosed in U.S. Pat. No. 3,041,893, tappers of this type incorporating a reverse rotation mechanism generally comprise a tapper main body to be connected to the drive portion of machine tool and rotatable in a specified direction, a positive rotation clutch rotatable with the main body and a reverse rotation clutch rotatble in the opposite direction to the main body. The driven shaft of the tapper is provided with a clutch pawl which is selectively engageable in grooves in the clutches to rotate the driven shaft in positive direction or reverse direction in changeable manner.

The clutch pawl employed in the conventional construction is usually in the form of a cylindrical pin and is provided integrally with the driven shaft. Accordingly, when the pin disengages from the groove of the positive rotation clutch to switch positive rotation to reverse rotation, the edge of grooved lower end of the clutch tends to engage with or bear against the pin, depressing the pin with the resulting reaction and thus exerting an impact load on the pin in the direction of thrust. The impact load is further delivered to the driven shaft immediately, with the result that the excess load frequently causes damage to the ridge of screw thread in the workpiece or to the tap. The same situation is also experienced when the pin comes into or is brought out of engagement with the groove of the reverse rotation clutch. At this time, the driven shaft is subjected to an upward thrust load, which similarly entails damage to the ridge of screw-thread or to the tap.

In an attempt to prevent the edge of the grooved portion of the clutch from engaging the clutch pawl and to thereby avoid occurrence of thrust impact load, a square or rectangular pawl has been proposed recently. Although the clutch pawl is effectively operable without involving the above-mentioned objectionable phenomenon and therefore free of thrust impact load, such improved result is available only for a very short early period of use. Through repeated use, in fact, the corners of the clutch pawl and of the grooved portion of the clutch are inevitably worn away and become rounded, with the result that the driven shaft is subjected to the above-mentioned thrust impact load which causes damage to the ridge of screw-thread in the workpiece or to the tap. Furthermore with the conventional construction in which the clutch pawl is made integral with the driven shaft, the aforesaid wear of the parts, once initiated, gives rise to a thrust impact repeatedly which in turn produces further wear on the parts. Thus the drawback described is all the more pronounced to result in the serious defect that the device becomes inoperable in a short period of use.

SUMMARY OF THE INVENTION

The object of this invention is to provide a tapper in which when the direction of rotation is to be switched the grooved portion of clutch is prevented from exerting a thrust impact load on the clutch pawl to the greatest possible extent, and a thrust impact load, even if produced due to the wear on the grooved portion of clutch and on the clutch pawl, will be mitigated and absorbed by the clutch effectively to render the driven shaft free of the load, so that the direction of rotation can be switched smoothly all the time without entailing damage to the ridge of screw-thread in a workpiece or to the tap.

Other objects and advantages of this invention will become more apparent from the following detailed description with reference to the accompanying drawings.

DESCRIPTION OF THE PREFERRED EMBODIMENT

Figure 2:
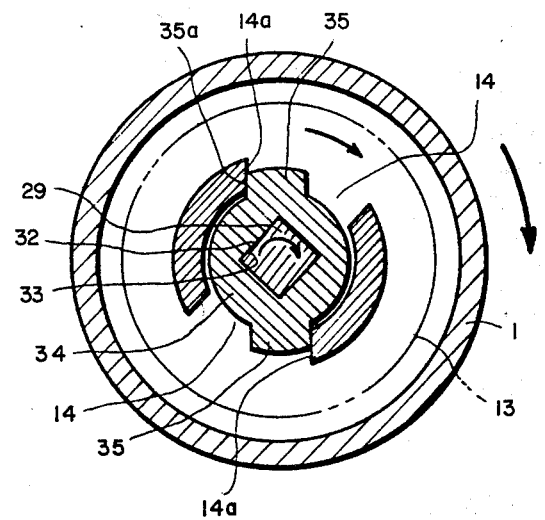
FIG. 2 is a view in section taken along the line II—II in FIG. 1.
Figure 3:
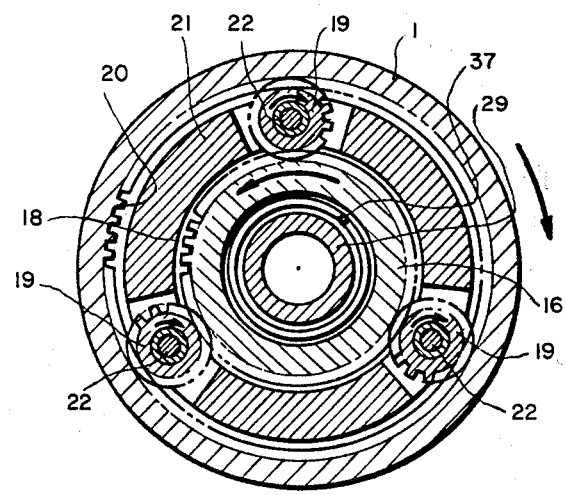
FIG. 3 is a view in section taken along the line III—III in FIG. 1.

A tapper main body 1 is in the form of an inverted cup and formed in its upper end with a tapered bore 2 for connection to the drive shaft of machine tool. A torque adjusting nut 3 is screwed onto the uppper end of the tapper main body 1 and keeps springs 6 compressed with a thrust bearing 4 and a plate 5 interposed therebetween. The springs 6 are loosely placed in bores 7 formed in the upper wall of the tapper main body 1 and arranged circumferentially thereof and bear against a plate 8. A torque transmitting clutch 9 comprises a drive ring 10 fitted in the tapper main body 1 and balls 11 retained by the drive ring and arranged circumferentially thereof. The plate 8 presses the balls 11 into pressing contact with cavity portions 12 of a positive rotation transmitting element 13 to deliver the torque of the tapper main body 1 to the positive rotation transmitting element 13. The trasmitting element 13 is rotatably supported by a bearing 15 within the tapper main body 1 and is normally rotatable with the tapper main body 1 by means of the torque transmitting clutch 9, but if one of the transmitting element 13 and the main body 1 (mainly the former) is overloaded, slip takes place between the balls 11 of the clutch 9, plate 8 and cavity portions 12 to absorb the excess load. In such event, the force of the springs 6 is adjusted by the torque adjusting nut 3 to control the timing of slip. The positive rotation transmitting element 13 is formed in its under side with clutch grooves, i.e. cutouts 14, 14 as seen in FIGS. 2 and 4.

Figure 4:
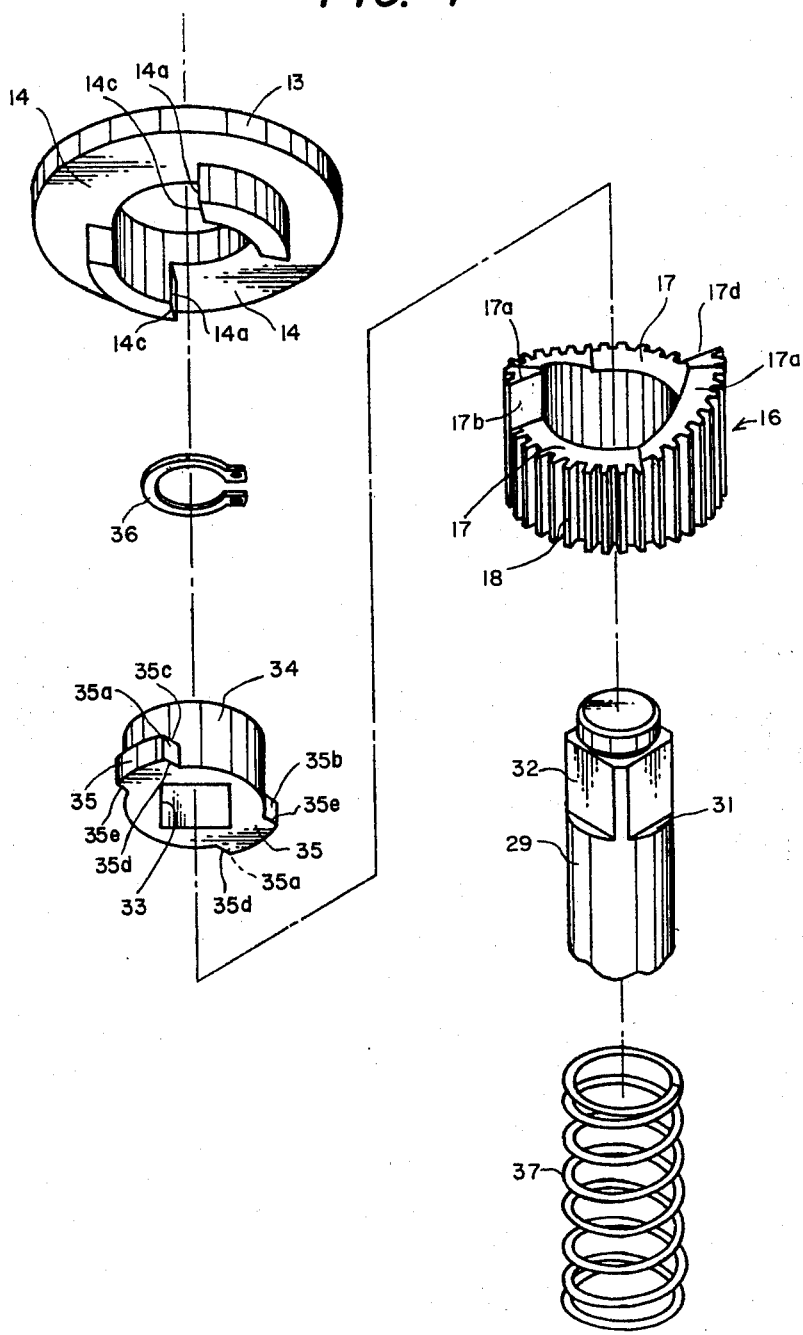
FIG. 4 is an exploded perspective view showing main parts of the embodiment.

FIG. 4 shows a reverse rotation transmitting element 16 having clutch grooves, namely cutouts 17, 17 in its top portion and formed with a gear 18 along its outer periphery. One side face defining each of the cutouts 17 is slanted as at 17a so that the rectangular pawl of a clutch ring to be described later will engage in the cutout 17 with ease. Planet gears 19 are interposed between and mesh with the gear 18 and a gear 20 formed in the inner surface of the tapper main body 1, whereby the reverse rotation transmitting element 16 is rendered reversely rotatable when the main body 1 rotates positively. The planet gears 19 are rotatably supported by pins 22 on a holder member 21 and are thereby prevented from revolution. The reverse rotation transmitting element 16 is slidable in axial direction, always in meshing engagement with the planet gears 19. Disposed between the lower end of the element 16 and the holder member 21 is a shock absorbing spring 23 which biases the element 16 upward all the time, with a clearance b formed between the lower end surface 16a of the element 16 and the surface 21a of the holder member 21. A stopper ring 24 for limiting the upward displacement of the reverse rotation transmitting element 16 is secured to the lower end surface of the positive rotation transmitting element 13 or the inner surface of inner race of the bearing 15. A holder lever 26 is connected to the under surface of the holder member 21 by a plate 25. The holder lever 26 is supported by a stationary post (not shown) or the like of machine tool only in vertically slidable manner to prevent the rotation of the holder member 21. The tapper main body 1 is rotatably supported by the holder member 21 with a bearing 27 interposed therebetween.

A driven shaft 29 is provided at its lower end with a chucking portion 30 for gripping a tap and is supported by the holder member 21 in reversely rotatable and axially slidable manner with an oilless journal bearing 28. The upper end of the driven shaft 29 has stepped portions 31, from which extends a square rod portion 32. A clutch ring 34 for switching the direction of rotation having a square bore 33 is fitted around the square rod portion. The clutch ring 34 is slidable on the rod portion 32 to some extent only in axial direction and is retained in position by a snap ring 36 or the like. A shock absorbing spring 37 is provided between the clutch ring 34 and the holder member 21, and rectangular pawls 35, 35 projecting from the outer periphery of the clutch ring 34 are normally engaged in the cutouts 14, 14 of the positive rotation transmitting element 13 elastically. In this state a clearance a is formed between the lower end surface of the clutch ring 34 and the stepped portions 31 of the driven shaft 29. A stopper plate 38 for limiting the upward displacement of the driven shaft 29 is held in position by a compression spring 39 which acts to compensate for the pressure when the tap engages a workpiece for the initiation of tapping operation. The spring 39 has a greater spring force than the shock abosrbing spring 37.

The tapper described above will operate in the following manner. First, the drive shaft of the machine tool is fitted into the tapered bore 2 of the main body 1, and the holder lever 26 is supported in vertically movable manner to a stationary portion such as a guide post of the tool. An unillustrated tap is mounted on the chucking portion 30 of the driven shaft 29. When the tapper main body 1 is then driven, the resulting torque is delivered to the positive rotation transmitting element 13 by way of the torque adjusting nut 3, thrust bearing 4, plate 5, springs 6, plate 8 and the torque transmitting clutch 9 of the ball type. The element 13 therefore rotates with the tapper main body 1. On the other hand, the torque is also transmitted from the inner gear 20 on the main body 1 to the planet gears 19 and then to the gear 18 to rotate the reverse rotation transmitting element 16 in the direction opposite to the rotational direction of the main body 1.

Figure 1:
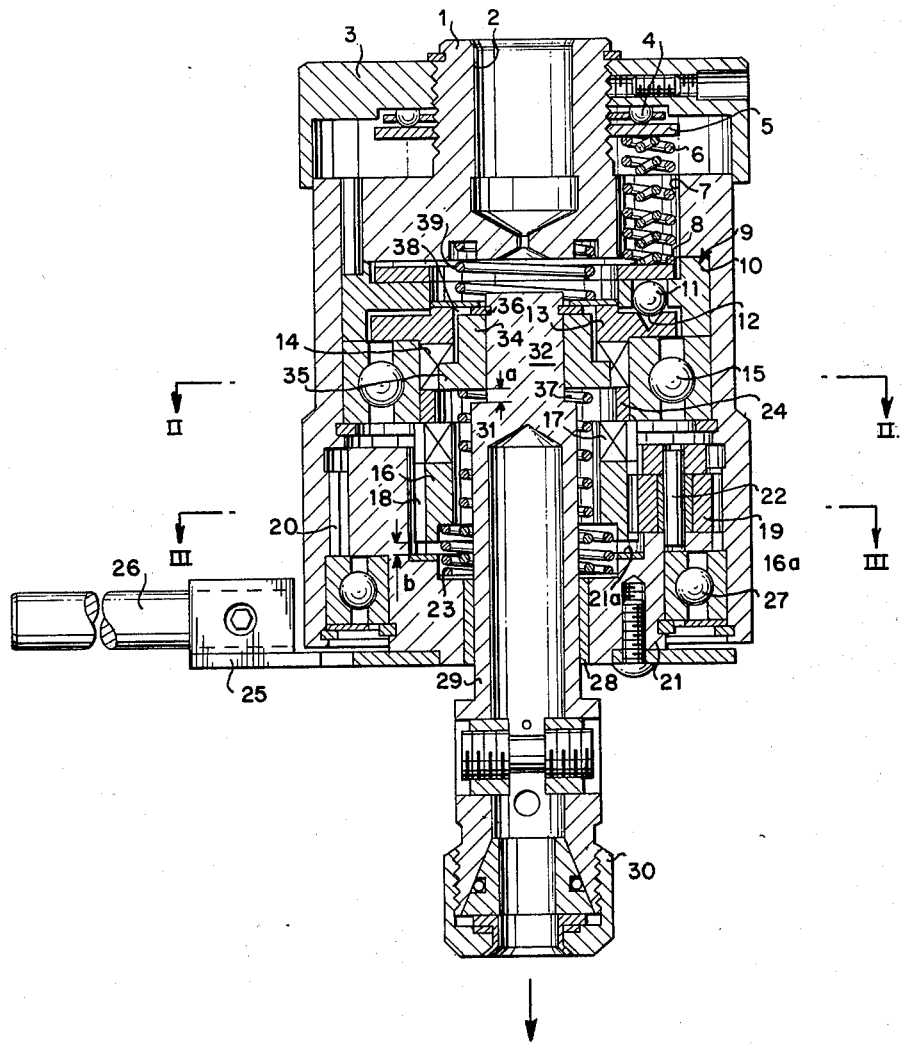
FIG. 1 is a view in vertical section showing an embodiment of this invention.

In the initial stage, the rectangular pawls 35 of the clutch ring 34 are in engagement with the cutout portions 14 of the positive rotation transmitting element 13, with the spring 37 acting to provide a clearance a between the under surface of the clutch ring 34 and the stepped portions 31 of the driven shaft 29 as shown in FIG. 1, causing the driven shaft 29 to rotate positively. In this state, the tapper main body 1 is progressively lowered for the initiation of tapping operation. Since one vertical side surface 35a of each pawl 35 on the clutch ring 34 is at this time in engagement with the vertical side surface 14a of each cutout portion 14 in the positive rotation transmitting element 13, the torque is transmitted accurately and efficiently. The load of impact produced upon the tap engaging a workpiece is absorbed by the spring 39, whilst when the tap is subjected to an abnormal excess load during tapping, the balls 11 of the torque transmitting clutch 9 slip to absorb the excess load, preventing the tap from accidental damage.

When the tap reaches the desired depth, the descending tapper main body 1 is stopped. The main body 1 is raised, or the tap is allowed to move further downward as being guided by screw threads after the main body has been stopped, causing the driven shaft 29 to move down relative to the main body. Consequently, the clutch ring 34 also lowers to disengage the rectangular pawls 35, 35 from the cutout portions 14, 14 of the positive rotation transmitting element 13. Inasmuch as the vertical surfaces 35a, 35a and vertical surfaces 14a, 14a have been in engagement with each other for the engagement of the pawls 35, 35 in the cutout portions 14, 14, the corners 14c, 14c of the element 13 do not bear against the corners 35c, 35c of the pawls in the course of disengagement but the pawls are disengaged therefrom smoothly, without allowing an impact load to act on the driven shaft 29 in the direction of thrust. However, during years of use, the corners 14c and 35c may be worn away, with the result that when the pawls 35, 35 are about to disengage from the cutout portions 14, 14, the corners 14c, 14c engage or bear against the corners 35c, 35c. Accordingly, the rotational torque delivered from the positive rotation transmitting element 13 to the clutch ring 34 is instantaneously changed to an output acting in the direction of thrust (i.e. downward) on the clutch ring 34 as an impact load. This phenomenon becomes more pronounced as the corners 14c, 14c and 35c, 35c progressively wear away due to repeated use. However, according to this invention in which the clutch ring 34 is spring-loaded as at 37 and mounted on the driven shaft 29 in axially movable manner, the above-mentioned impact load, when acting on the clutch ring 34, is not delivered to the driven shaft 29 immediately but is absorbed by the spring 37 while the clutch ring 34 is being retracted within the range of clearance a against the spring 37. Thus the driven shaft 29 will move down smoothly as being guided by screw-threads without causing damage to the tap.

As the driven shaft 29 further advances, the rectangular pawls 35, 35 on the clutch ring 34 descending with the shaft 29 disengage from the cutout portions 14, 14 of the positive rotation transmitting element 13 and thereafter engage in the cutout portions 17, 17 of the reverse rotation transmitting element 16, automatically bringing the driven shaft 29 into reverse rotation. At this time, the rectangular pawls 35, 35 on the clutch ring 34 come into engagement with the cutout portions 17, 17 while being guided along the slanting face 17a, 17a of the reverse rotation transmitting element 16, and the torque in the reverse direction is delivered to the clutch ring 34 by virtue of the engagement between the vertical side surfaces 17b, 17b and 35b, 35b of both members. When this engagement is to be effected, a thrust force also acts instantaneously on the clutch ring 34 to urge the ring upward which force would prevent smooth engagement of the clutch. This phenomenon becomes pronounced with the increasing local wear on the corners 35d, 35d and 35e, 35e of pawls 35, 35 of the clutch ring 34 and on the corners 17d, 17d of cutout portions 17, 17 of the reverse rotation transmitting element 16 due to repeated use. According to this invention, however, the upward thrust impact load, if produced owing to such local wear, is absorbed by the element 16 being retracted within the range of clearance b against the action of spring 23 and will not be delivered immediately to the driven shaft 29, whereby the tap can be completely prevented from accidentally dropping from the chucking portion 30 or from unexpected damage.

In this way, the driven shaft 29 is rotated in positive direction to tap the workpiece to the specified depth, and the driven shaft 29 is then automatically brought into reverse rotation. In this state the tapper main body 1 is returned upward to remove the tap from the workpiece, whereby the tapping operation is completed. Upon the removal of the tap from the workpiece, the restoring force of the spring 37 returns both clutch ring 34 and driven shaft 29 upward, bringing the rectangular pawls 35, 35 on the clutch ring 34 into engagement with the cutout portions 14, 14 in the positive rotation transmitting element 13. The parts are now returned to the original position. In the course of this movement, namely when the pawls 35, 35 of clutch ring 34 disengage from the cutout portions 17, 17 of reverse rotation transmitting element 16 and also when the pawls 35 engage in the cutout portions 14, 14 of positive rotation transmitting element 13, the same thrust impact load (vibration) as already described will be produced, but the impact load or vibration is absorbed by the springs 23 and 37 as already stated.

It will be apparent from the above description that since the present invention employs rectangular clutch pawls and therefore gives a large torque transmitting area, the torque from the tapper main body can be transmitted to the positive rotation transmitting element and the reverse rotation transmitting element and then to the clutch pawls accurately and efficiently, making it sure that the driven shaft will be rotated smoothly all the time whether in positive direction or reverse direction. Even if the clutch ring is subjected to an excess impact load in thrust direction or to vibration when switching the direction of rotation due to local wear on the pawls or on the grooved portions of the positive and reverse rotation transmitting elements, the load or vibration is effectively absorbed instead of being immediately delivered to the driven shaft. Thus the direction of rotation can be switched accurately while the driven shaft is smoothly rotatable all the time.

I claim:

1. A tapper incorporating a reverse rotation mechanism and comprising a rotatable tapper main body, a positive rotation transmitting element disposed in the main body and rotatable therewith, a reverse rotation transmitting element disposed in the main body and rotatable by the main body in a direction opposite to the direction of rotation of the main body, a holder member disposed in a lower portion of the main body, a driven shaft for holding a tap supported by the holder member and rotatable in positive and reverse directions, the driven shaft being axially movable, a clutch for switching over the direction of rotation mounted in axially movable manner on the driven shaft and selectively engageable with the positive rotation transmitting element or with the reverse rotation transmitting element to rotate the driven shaft in positive or reverse direction, each of the positive rotation transmitting element, the reverse rotation transmitting element and the clutch being in the form of an integral cylindrical member, each of the positive rotation transmitting element and the reverse rotation transmitting element having cutout portions engageable with projections of the clutch, the positive rotation trasmitting element being pressed from above by springs mounted on the main body with a ball bearing interposed between the positive rotation trasmitting element and the springs to trasmit torque from the main body to the driven shaft and to absorb an excess load on the driven shaft, the driven shaft being provided on its upper end with a shock absorbing spring acting within a predetermined range to absorb an upward impact load to be exerted on the driven shaft upon the tap engaging a workpiece, the holder member being in the form of a cylinder housing the reverse rotation transmitting element with a plurality of pinions arranged around the reverse rotation transmitting element, the pinions meshing with teeth formed in the inner peripheral surface of the main body and with teeth formed in the outer peripheral surface of the reverse rotation transmitting element, each of the clutch and the reverse rotation transmitting element being provided with a spring for absorbing an axially downward impact load.

2. The tapper as set forth in claim 1 wherein the holder member has an engaging portion extending outwardly from the main body and the engaging portion is retained outside of the main body to thereby prevent the rotation of the holder member.

* * * * *